United States Patent
Yang

(10) Patent No.: US 8,658,886 B2
(45) Date of Patent: Feb. 25, 2014

(54) PHOTOELECTRIC CONVERSION MODULE

(75) Inventor: Nam-Choul Yang, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 97 days.

(21) Appl. No.: 13/240,772

(22) Filed: Sep. 22, 2011

(65) Prior Publication Data

US 2012/0285514 A1    Nov. 15, 2012

Related U.S. Application Data

(60) Provisional application No. 61/486,084, filed on May 13, 2011.

(51) Int. Cl.
*H01L 31/00* (2006.01)

(52) U.S. Cl.
USPC .......................... 136/252; 136/259

(58) Field of Classification Search
USPC ........................ 136/251, 252, 259
See application file for complete search history.

(56) References Cited

U.S. PATENT DOCUMENTS

2009/0065049 A1* 3/2009 Son et al. ............ 136/256
2011/0048510 A1   3/2011 Yang et al.

FOREIGN PATENT DOCUMENTS

| EP | 2 211 418 A1 | 7/2010 |
| JP | 2007220606 A * | 8/2007 |
| JP | 2008-251421 A | 10/2008 |
| JP | 2009-032614 A | 2/2009 |
| KR | 10-2010-0075552 A | 7/2010 |
| KR | 10-2011-0024960 A | 3/2011 |

* cited by examiner

*Primary Examiner* — Eli Mekhlin
(74) *Attorney, Agent, or Firm* — Knobbe, Martens, Olson & Bear, LLP

(57) ABSTRACT

A photoelectric conversion module is disclosed. In one embodiment, the photoelectric conversion module includes i) a plurality of photoelectric cells spaced apart from each other, wherein a perimeter is defined to surround the photoelectric cells, and wherein the perimeter does not pass through the spaces between neighboring photoelectric cells, ii) an electrolyte provided in the photoelectric cells and iii) a plurality of sealing frits surrounding the photoelectric cells, respectively, wherein each of the sealing frits is continuously formed.

6 Claims, 12 Drawing Sheets

PHOTOELECTRIC CONVERSION MODULE

RELATED APPLICATION

This application claims priority to and the benefit of Provisional Patent Application No. 61/486,084 filed on May 13, 2011 in the U.S. Patent and Trademark Office, the entire contents of which are incorporated herein by reference.

BACKGROUND

1. Field

The described technology generally relates to photoelectric conversion modules.

2. Description of the Related Technology

Photoelectric conversion devices such as solar cells convert light energy into electric energy and have been studied as an energy source for replacing fossil fuels. Thus, solar cells have come into the spotlight for research, development and commercialization.

Different types of solar cells having various driving principles have been investigated. Silicon or crystalline solar cells have a wafer shape and include a p-n semiconductor junction, but the manufacturing costs thereof are high due to the characteristics of processes for forming and handling semiconductor materials which require a high degree of purity.

Unlike silicon solar cells, dye-sensitized solar cells mainly include a photosensitive dye for generating excited electrons in response to visible light, a semiconductor material for receiving the excited electrons, and an electrolyte for reacting with the excited electrons in an external circuit. Dye-sensitized solar cells have high photoelectric conversion efficiency compared to the silicon solar cells, and thus are expected to be the next generation solar cells.

SUMMARY

One inventive aspect is a photoelectric conversion module having improved sealing characteristics.

Another aspect is a photoelectric conversion module, comprising: a plurality of photoelectric cells spaced apart from each other, wherein a perimeter is defined to surround the photoelectric cells, and wherein the perimeter does not pass through the spaces between neighboring photoelectric cells; an electrolyte provided in the photoelectric cells; and a plurality of sealing frits surrounding the photoelectric cells, respectively, wherein each of the sealing frits is continuously formed.

In the above module, each of the sealing frits does not contain discrete particles. The above module, further comprising a sealant covering the sealing fits and surrounding the perimeter of the photoelectric cells. The above module further comprises at least one support member surrounding the perimeter of the photoelectric cells, wherein the support member is farther from the photoelectric cells than the sealing frits, and wherein the sealant substantially completely covers the support member. In the above module, the support member is substantially parallel with the sealing fits. The above module further comprises: a first support member surrounding the perimeter of the photoelectric cells, wherein the first support member is farther from the photoelectric cells than the sealing fits; and a second support member surrounding the first support member.

In the above module, the sealant substantially completely covers the first and second support members. In the above module, the first and second support members are substantially parallel with each other. In the above module, a cross-section of at least one of the first and second support members has a substantially rectangular shape, and wherein the four corners of the cross-section are curved. In the above module, the sealant has an outer-most surface farthest from a selected photoelectric cell, wherein the second support member has a side surface farthest from the selected photoelectric cell, and wherein the distance between the outer-most surface of the sealant and the side surface of the second support member is in the range from about 0.5 mm to about 5 mm.

In the above module, the sealant has an inner-most surface closest to a selected photoelectric cell, wherein the sealing frit surrounding the selected photoelectric cell has a side surface closest to the photoelectric cell, and wherein the distance between the inner-most surface of the sealant and the side surface of the sealing frit is in the range from about 0.05 mm to about 0.5 mm. In the above module, the width of the sealant is in the range from about 1 mm to about 10 mm. The above module further comprises a plurality of connection members each of which is formed between neighboring photoelectric cells.

In the above module, a selected connection member is formed between first and second photoelectric cells neighboring each other, wherein the selected connection member comprises first and second surfaces opposing each other, wherein the first surface of the connection member is connected to a first electrode extending from the first photoelectric cell, and wherein the second surface of the connection member is connected to a second electrode extending from the second photoelectric cell.

In the above module, the sealant substantially completely covers the sealing frits. In the above module, each of the photoelectric cells has a substantially rectangular parallelepiped shape, wherein each of the sealing fits comprises a pair of long sides and a pair of short sides, wherein each of the long sides comprises at least one first sub-frit, wherein each of the short sides comprises a plurality of second sub-frits spaced apart from each other, and wherein the sealant is formed between the sub-frits. In the above module, the second sub-frits are substantially parallel with each other.

Another aspect is a photoelectric conversion module, comprising: a first substrate; a second substrate opposing and spaced apart from the first substrate; a plurality of sealing fits; a plurality of photoelectric cells defined by the substrates and the sealing frits, wherein the sealing frits surround the photoelectric cells, respectively, wherein the photoelectric cells are spaced apart from each other, wherein a perimeter is defined to surround the photoelectric cells, and wherein the perimeter does not pass through the spaces between neighboring photoelectric cells; an electrolyte provided in the photoelectric cells; and a sealant covering the sealing frits and surrounding the perimeter of the photoelectric cells.

In the above module, each of the photoelectric cells has a substantially rectangular parallelepiped shape, wherein each of the sealing frits comprises a pair of long sides and a pair of short sides, wherein each of the long sides comprises at least one first sub-frit; wherein each of the short sides comprises a plurality of second sub-frits spaced apart from each other, and wherein the sealant is formed between the sub-frits.

In the above module, each of the sealing fits is continuously formed. In the above module, each of the photoelectric cells comprises: a first electrode formed on a first surface of the photoelectric cell; a catalyst layer formed on the first electrode; a second electrode formed on a second surface of the photoelectric cell, wherein the second surface faces the first surface; and a semiconductor layer formed on the second electrode. The above module further comprises at least one support member surrounding the perimeter of the photoelectric cells, wherein the support member is farther from the photoelectric cells than the sealing frits, and wherein the sealant substantially completely covers the support member.

Another aspect is a photoelectric conversion module, comprising: a first substrate; a second substrate opposing and spaced apart from the first substrate; a plurality of sealing frits; a plurality of photoelectric cells defined by the substrates and the sealing frits, wherein each of the sealing frits surrounds the respective photoelectric cell, and wherein the photoelectric cells are spaced apart from each other; wherein each of the photoelectric cells has a substantially rectangular parallelepiped shape, and wherein each of the sealing frits comprises a plurality of sub-sealing frits; and an electrolyte provided in the photoelectric cells.

In the above module, the sub-sealing fits are substantially parallel with each other. In the above module, each of the photoelectric cells has a substantially rectangular parallelepiped shape, wherein each of the sealing frits comprises a pair of long sides and a pair of short sides, wherein each of the long sides comprises at least one first sub-frit, wherein each of the short sides comprises a plurality of second sub-frits spaced apart from each other, and wherein the sealant is formed between the sub-frits. In the above module, the first and second sub-sealing frits are substantially parallel with each other.

DETAILED DESCRIPTION

Figure 1:
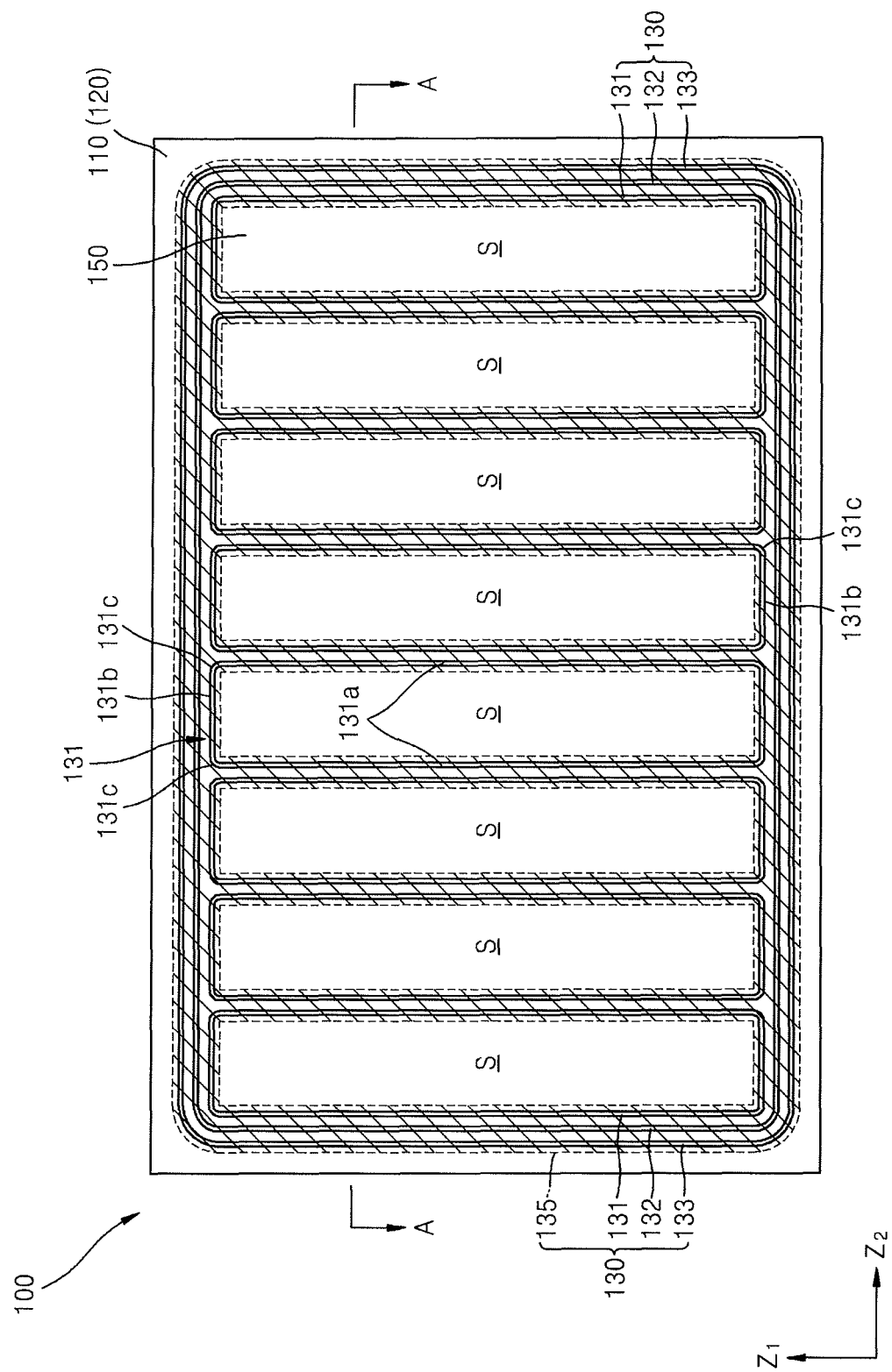
FIG. 1 is a plan view of a photoelectric conversion module according to an embodiment.

Reference will now be made in detail to embodiments, examples of which are illustrated in the accompanying drawings, wherein like reference numerals refer to the like elements throughout.

Figure 2:
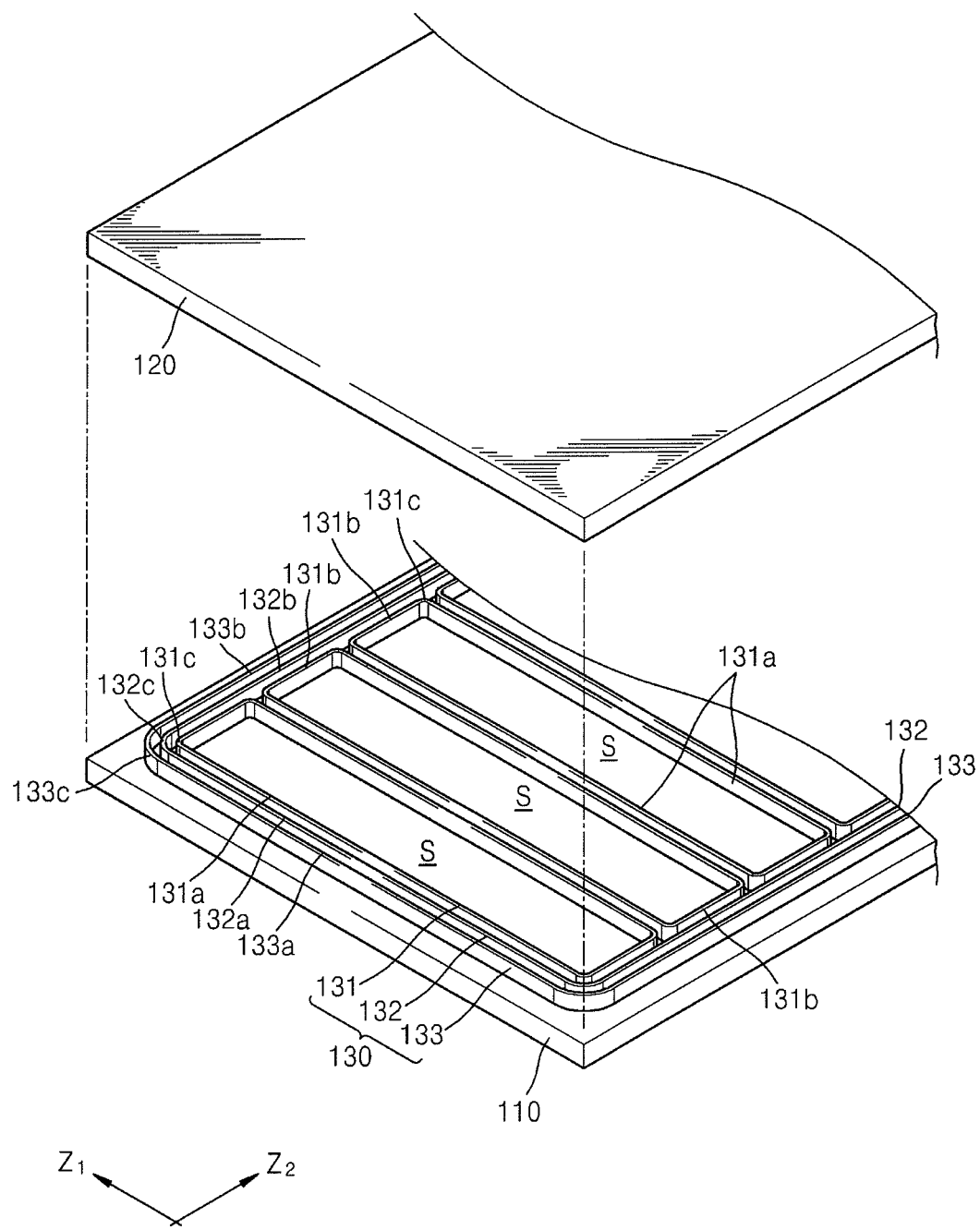
FIG. 2 is a perspective view of a portion of the photoelectric conversion module of FIG. 1, according to an embodiment.

FIG. 1 is a plan view of a photoelectric conversion module 100 according to an embodiment. FIG. 2 is a perspective view of a portion of the photoelectric conversion module 100 of FIG. 1 according to an embodiment.

Referring to FIGS. 1 and 2, the photoelectric conversion module 100 includes a plurality of photoelectric cells S and a sealing member 130 disposed between neighboring photoelectric cells S so as to define the photoelectric cells S. An electrolyte 150 is filled in the photoelectric cells S and is sealed by the sealing member 130 that is formed along edges of the photoelectric conversion module 100 and between neighboring photoelectric cells S. The sealing member 130 surrounds and seals the electrolyte 150 so that the electrolyte 150 does not leak.

The sealing member 130 may include sealing frits 131 extending along the respective photoelectric cells S, support members 132 and 133 disposed outside the sealing frits 131, and a sealant 135 formed to cover the sealing frits 131 and the support members 132 and 133.

The sealing frits 131 may surround the respective photoelectric cells S so as to define the respective photoelectric cells S. In at least one embodiment, the sealing frits 131 are continuously formed. For example, instead of being formed of non-continuous particles (such as discrete particles), the sealing frits 131 may be formed of a continuously formed material such as glass frit. The sealing fit 131 may be formed to have an independent closed-loop shape so as to individually surround each of the photoelectric cells S. The neighboring photoelectric cells S may be defined by the sealing frits 131 that are formed independently from each other. In addition, a plurality of sealing fits 131 may be disposed so as to surround the respective photoelectric cells S. In one embodiment, the sealing frit 131 performs as a spacer for maintaining a cell gap of the photoelectric cells S that are arranged between first and second substrates 110 and 120, and performs as a diffusion barrier for preventing an electrolyte (not show) in the photoelectric cells S from leaking outwards and for preventing external harmful substances, such as moisture, from entering the photoelectric cells S.

As described below, connection members (not shown) may be disposed between the neighboring sealing frits 131. The connection members (not shown) may electrically connect the neighboring photoelectric cells S to each other so as to make the photoelectric cells S as a module. For example, a group of the photoelectric cells S between the first and second substrate 110 and 120 may be formed to a module by connecting the neighboring photoelectric cells S in series or in parallel to each other.

Each photoelectric cell S may be formed to have an approximately rectangular shape. The sealing frit 131 may extend to have a closed-loop shape along each photoelectric cell S. However, shapes of the photoelectric cell S and the sealing frit 131 extending along the photoelectric cell S are not particularly limited, and may be changed in various ways.

As shown in FIG. 2, the sealing fit 131 includes a first line portion 131a extending in a first direction Z1, a second line portion 131b extending in a second direction Z2, and a curved line portion 131c for connecting the first and second line portions 131a and 131b to each other and for rounding the first and second line portions 131a and 131b. In the sealing frit 131 surrounding the photoelectric cell S, the first line portion 131a may include a pair of lines extending in substantially parallel to each other in the first direction Z1, and similarly, the second line portion 131b may include a pair of lines extending in substantially parallel to each other in the second direction Z2. For example, the first and second line portions 131a and 131b extend in the first and second directions Z1 and Z2 crossing each other. The curved line portion 131c is formed between the first and second line portions 131a and 131b so as to connect the first and second line portions 131a and 131b to have a curved shape. The curved line portion 131c may remove a height difference along the sealing fit 131, and may have a curved shape which is a portion of an imaginary arc with a predetermined radius of curvature so as not to form a sharp corner. For example, the curved line portion 131 may be a portion of an imaginary arc with a radius of curvature, which is greater than the thickness of the curved line portion 131c.

If the first and second line portions 131a and 131b contact each other to form a sharp corner, for example, a rectangular shape, a contact portion between the first and second line portions 131a and 131b protrudes compared to the remaining portions of the sealing frit 131, and thus the sealing frit 131 may come off the first substrate 110 or the second substrate 120. This may reduce sealing performance of the sealing member 130 and may cause an electrolyte to leak, which will be described later in detail.

In one embodiment, as shown in FIG. 2, the sealing frits 131 are formed to independently surround the respective photoelectric cells S. The sealing frit 131 surrounding a single photoelectric cell S is isolated from another sealing frit 131 surrounding another photoelectric cell S, and forms a closed loop. For example, the sealing frits 131 form closed loops that are independently formed from each other so as not to be structurally connected to each other.

Unlike in FIG. 2, if sealing frits 131 that are structurally connected to each other define neighboring photoelectric cells S, the sealing frits 131 are divided so as to extend along the neighboring photoelectric cells S so as to form a division portion. The division portion protrudes compared to the remaining portions of the sealing frits 131. Thus, the sealing frits 131 may not be adhered to the first and second substrates 110 and 120 and may come off the first and second substrates 110 and 120, which will be described later in detail. Support members 132 and 133 may extend along edges of the first and second substrates 110 and 120 so as to surround a contour of the sealing frits 131, and may extend in substantially parallel to the sealing fits 131 as a whole. In one embodiment, as shown in FIG. 1, the sealant 135 substantially completely covers the support members 132 and 133. In one embodiment, the first and second support members 132 and 133 are substantially parallel with each other. However, the support members 132 and 133 are optional, and thus may be omitted.

Figure 3:
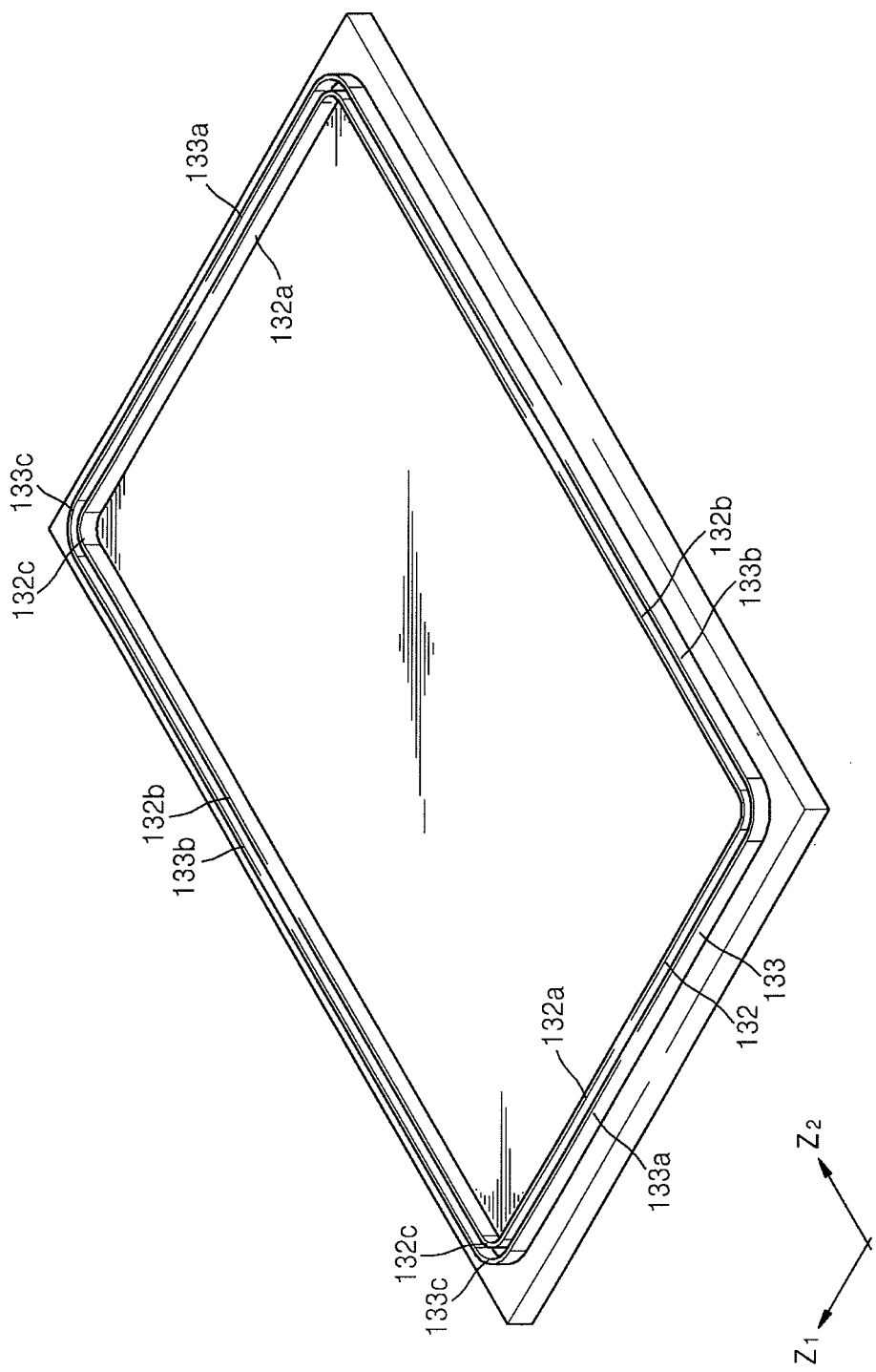
FIG. 3 is a perspective view of support members of FIG. 1 according to an embodiment.

FIG. 3 is a perspective view of the support members 132 and 133 of FIG. 1, according to an embodiment. Referring to FIG. 3, the support members 132 and 133 may each include at least two layers, and may include first and second support members 132 and 133 that extent in substantially parallel to each other. However, the present embodiment is not limited, and for example, each of the support members 132 and 133 may be formed of a single layer.

The support members 132 and 133 may extend along edges of the first and second substrates 110 and 120 so as to stably support the cell gap between the first and second substrates 110 and 120. The support members 132 and 133 may also extend to surround the photoelectric cells S constituting the photoelectric conversion module 100 so as to prevent penetration of external harmful substances, such as moisture, into the photoelectric cells S.

The support members 132 and 133 may be formed together with the sealing frits 131 formed to surround the photoelectric cells S by using a single patterning process. For example, the support members 132 and 133 may be formed of the same material as the sealing frits 131.

In FIG. 3, the support members 132 and 133 may extend to surround the edge of the first substrate 110, and may include the first line portions 132a and 133a extending in a first axis (Z1) direction, the second line portions 132b and 133b extending in a second axis (Z2) direction, and the curved portions 132c and 133c that smoothly connect the first and second line portions 132a and 133a, and 132b and 133b to each other. The first line portions 132a and 133a may each have a pair of lines extending in substantially parallel to each other in the first direction Z1. The second line portions 132b and 133b may each have a pair of lines extending in substantially parallel to each other in the second direction Z2. For example, the first and second line portions 132a and 133a, and 132b and 133b extend in the first and second directions Z1 and Z2 crossing each other. The curved portions 132c and 133c are formed between the first and second line portions 132a and 133a, and 132b and 133b so as to connect the first and second line portions 132a and 133a, and 132b and 133b to have a curved shape.

The curved portions 132c and 133c may remove a height difference along the support members 132 and 133, and may have a curved shape which is a portion of an imaginary arc with a predetermined radius of curvature so as not to form a sharp corner. For example, the curve portions 132c and 133c of the support members 132 and 133 may be a portion of an imaginary arc with a radius of curvature and may extend in substantially parallel to the sealing frit 131. Like in FIG. 2, the curved line portion 131c of the sealing frit 131 and the curve portions 132c and 133c of the support members 132 and 133 may constitute a portion of an arc with the same radius of curvature. The sealing fits 131 and the support members 132 and 133 may extend in substantially parallel to each other along a trace of an arc.

Unlike in FIG. 3, if the first and second line portions 132a and 133a, and 132b and 133b contact each other to form a sharp corner, for example, a rectangular shape, a contact portion between the first and second line portions 132a and 133a, and 132b and 133b protrudes compared to the remaining portions of the support members 132 and 133, the support members 132 and 133 may come off the first substrate 110 or the second substrate 120. This may reduce sealing performance of the support members 132 and 133 and may cause an electrolyte to leak, which will be described later in detail.

Figure 4:
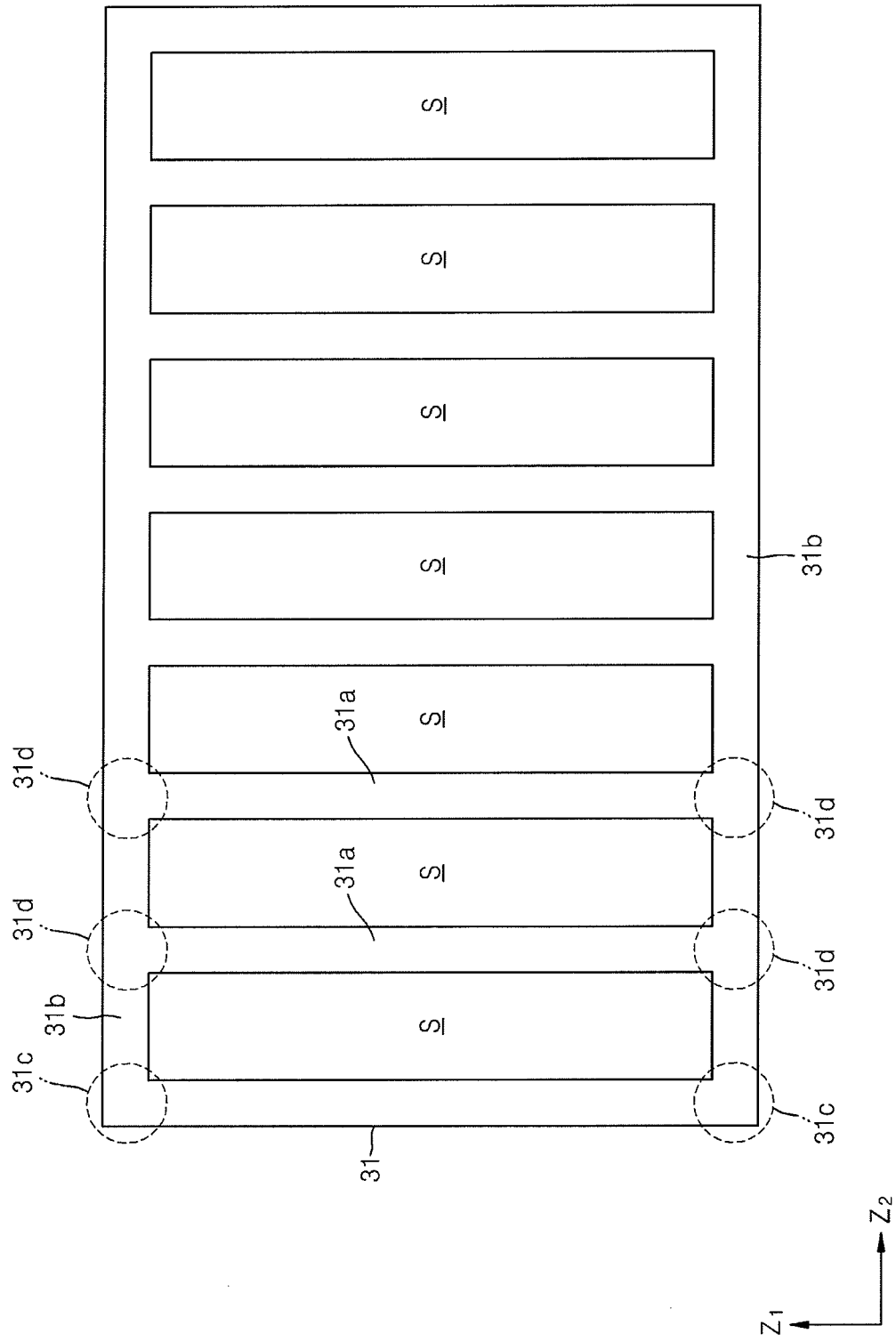
FIG. 4 is a plan view of a sealing frit according to a comparative example.

FIG. 4 is a plan view of a sealing fit 31 according to a comparative example. Referring to FIG. 4, the sealing frit 31 is disposed between neighboring photoelectric cells S so as to define the photoelectric cells S.

The sealing frit 31 extends to be connected and defines the photoelectric cells S. That is, a portion of the sealing frit 31 for defining a single photoelectric cell S is structurally connected to another portion of the sealing frit 31 for sealing a neighboring photoelectric cell S so that portions of the sealing frit 31 may be connected to each other. Thus, a first portion 31a of the sealing frit 31 for defining the neighboring photoelectric cells S may include division portions 31d divided around the different photoelectric cells S from two ends of the first portion 31a.

The division portion 31d of the sealing fit 31 protrudes compared to the remaining portions of the sealing frit 31, and a height difference may be generated. A height of the sealing fit 31 is measured along a cell gap between first and second substrates.

The first portion 31a extending along the first axis (Z1) direction is divided into two parts extending along opposite directions on a second axis (Z2) along the neighboring photoelectric cells S from the division portion 31d of the sealing frit 31. A height difference is generated in the division portion 31d of the sealing frit 31.

The sealing frit 31 for supporting the cell gap between the first and second substrates has height differences in various points in a direction in which the sealing frit 31 extends, and for example, the sealing frit 31 is formed to have a relatively great height or a relatively small height along the direction. Thus, the sealing frit 31 may come off the first substrate or the second substrate, and thus sealing performance of the sealing frit 31 may be reduced. That is, if the sealing frit 31 defining the photoelectric cells S together with the first and second substrates has a height difference rather than being uniformly formed, the sealing fit 31 may be come off the first or second substrate, and thus the sealing characteristics of the photoelectric cells S may be reduced, and an electrolyte (not shown) contained in the photoelectric cells S may leak.

The division portion 31d of the sealing fit 31 may partially protrude. For example, the first portion 31a defining the neighboring photoelectric cells S may have division portions 31d divided from two ends of the first portion 31a. The division portion 31d of the two ends of the first portion 31a partially protrude so that a central portion of the first portion 31a may not be closely attached to the first or second substrate and may come off the first or second substrate, and thus sealing performance of the photoelectric cells S is reduced, and an electrolyte (not shown) contained in the photoelectric cells S may leak.

In FIG. 4, the first portion 31a of the sealing frit 31 extending in the first axis (Z1) direction and a second portion 31b of the sealing fit 31 extending in the second axis (Z2) direction are connected to form a sharp corner, a connection portion 31c for connecting the first and second portions 31a and 31b may partially protrude compared to the remaining portions of the sealing frit 31.

For reference, the connection portion 31c for connecting the first and second portions 31a and 31b of the sealing frit 31 may correspond to the division portion 31d that is divided into two parts in opposite directions on the second axis (Z2) in order to surround different photoelectric cells S. However, an outermost connection portion 31c of the sealing frit 31 is different from the division portion 31d. If the outermost connection portion 31c of the sealing frit 31 forms a sharp corner, the connection portion 31c may protrude to generate a height difference, like in the division portion 31d.

Figure 5:
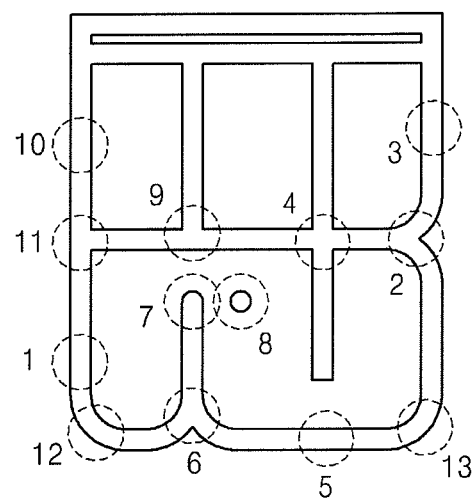
FIG. 5 is a diagram for explaining a height difference of a sealing frit.

As described above, a height difference generated on a portion where the sealing frit 31 is divided or portions of the sealing fit 31 cross each other may be obviously seen. FIG. 5 shows patterns of a sealing frit, which extend in various ways. Table 1 shows heights of a sealing frit, which are measured in various points.

TABLE 1

| Number of points | Height of sealing frit (μm) |
|---|---|
| 1 | 40 |
| 2 | 49 |
| 3 | 39 |
| 4 | 52 |
| 5 | 40 |
| 6 | 50 |
| 7 | 43 |
| 8 | 32 |
| 9 | 48 |

TABLE 1-continued

| Number of points | Height of sealing frit (μm) |
|---|---|
| 10 | 39 |
| 11 | 48 |
| 12 | 40 |
| 13 | 39 |

As shown in Table 1, heights of the sealing frit, which are measured in points (2, 4, 6, 9, and 11) such as a division portion divided to two parts in opposite directions and a connection portion where patterns extending in different directions cross each other, are greater than in the remaining points. That is, a height different may be caused due to the division portion and the connection portion.

Thus, in FIG. 2, the sealing frits 131 are formed to independently surround the photoelectric cells S so as not to form a division portion that is divided to surround the neighboring photoelectric cells S.

The curved portions 132c and 133c having a curve shape may be formed between the first line portions 132a and 133a and the second line portions 132b and 133b of the support members 132 and 133, which extend in different directions, in order to smoothly connect the first and second line portions 132a and 133a, and 132b and 133b to each other so as not to form a connection having a sharp corner.

Figure 6:
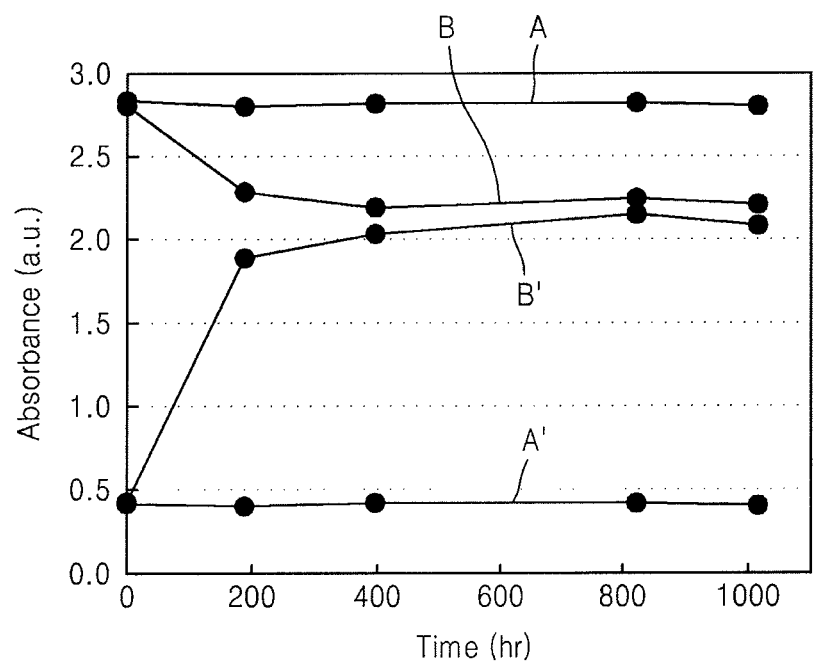
FIG. 6 is a graph showing results of iodine diffusion barrier test performed between neighboring photoelectric cells, as shown in FIGS. 2 and 4.

FIG. 6 is a graph showing results of iodine diffusion barrier test performed between neighboring photoelectric cells, in FIGS. 2 and 4. In this case, the sealing frit 31 in FIG. 4 has a height difference of a maximum of about 6 μm. A horizontal axis indicates a time (hr), and a vertical axis indicates absorbance in a maximum absorbing wavelength of iodine.

In the iodine diffusion barrier test, one of the neighboring photoelectric cells contains iodine, and another one doe not contain iodine. The test is performed at a high temperature of, for example, about 85° C. At a predetermined point of time, the iodine diffusion barrier test is performed from the photoelectric cell including iodine to the photoelectric cell without iodine. That is, after a predetermined period of time elapses, absorbance is measured in an iodine maximum absorbing wavelength (about 390 nm-about 410 nm) in each cell. In this case, the absorbance is obtained as follows.

Absorbance=−log T, where T is transmittance.

In FIG. 6, profiles A and A' indicate measured absorbance in FIG. 2. For example, the profile A indicates absorbance in a cell containing iodine. The profile A' indicates absorbance in a cell without iodine. In addition, profiles B and B' indicate measured absorbance in FIG. 4. For example, the profile B indicates absorbance in a cell containing iodine. The profile B' indicates absorbance in a cell without iodine.

As shown in the profiles A and A', absorbance of iodine is negligibly changed, which represents that excellent sealing characteristics are maintained.

On the other hand, as shown in the profiles B and B', absorbance of iodine is changed due to diffusion of iodine. For example, within about 200 hours, the absorbance of iodine is remarkably changed, which represents that sealing characteristics remarkably deteriorate. That is, according to embodiments, the sealing characteristics are negligibly changed. On the other hand, in the comparative example, the sealing characteristics are remarkably reduced within about 200 hours.

Figure 7:
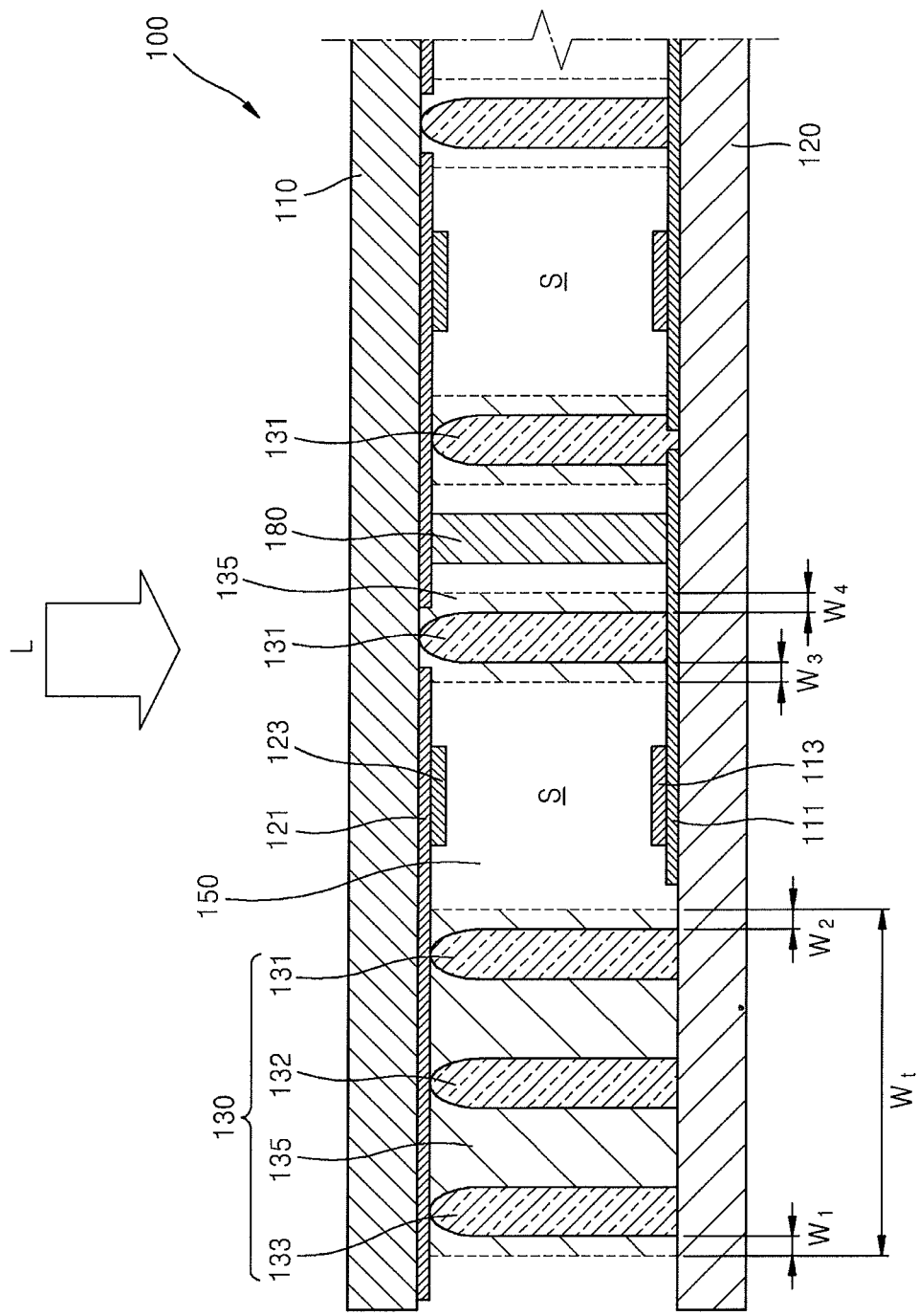
FIG. 7 is a cross-sectional view of the photoelectric conversion module taken along a line A-A of FIG. 1 according to an embodiment.

FIG. 7 is a cross-sectional view of the photoelectric conversion module 100 taken along a line A-A of FIG. 1 according to an embodiment. Referring to FIG. 7, the sealing frits 131 together with the first and second support members 132 and 133 are formed in substantially parallel to each other between the first and second substrates 110 and 120. In addition, the sealing frit 131 and the support members 132 and 133 are covered by a sealant 135.

The sealing fit 131, and the support members 132 and 133 may be formed of substantially the same material, and may be substantially simultaneously formed by using a patterning process. For example, the sealing fit 131 and the support members 132 and 133 may be formed on the first substrate 110 to have patterns, and may be closely attached to the second substrate 120 by interposing the sealant 135 for covering the sealing frit 131 and the support members 132 and 133. The sealing frit 131 and the support members 132 and 133 may be formed to be a glass frit, and may be substantially simultaneously formed by using pattern printing and curing processes of a frit paste.

The sealant 135 may be formed of a resin, for example, an organic resin component or a hot-melt resin component. The sealant 135 may be consecutively formed to cover the sealing frit 131 and the support members 132 and 133. In addition, the sealant 135 may be formed to exceed the sealing frit 131 and the support members 132 and 133. For example, the sealant 135 may be formed outwards from a lateral end of the second support member 133 to exceed the second support member 133 by a first width W1. The sealant 135 may be formed inwards from a lateral end of the sealing frit 131 to exceed the sealing frit 131 by a second width W2. In this case, the first width W1 and the second width W2 by which the sealant 135 exceeds the second support member 133 and the sealing fit 131 may be from about 0.5 mm to about 5 mm, and from about 0.05 mm to about 0.5 mm, respectively. In one embodiment, since a portion of the sealant 135, having the second width W2, is adjacent to a photoelectric cell S1, the sealant 135 is controlled not to be spread, and thus the second width W2 may be from about 0.05 mm to about 0.5 mm. In addition, since a portion of the sealant 135, having the first width W1, does not need to be precisely controlled to be spread, compared to the portion of the sealant 135, having the second width W2, the first width W1 may be from about 0.5 mm to about 5 mm. The above range (about 0.05 mm to about 5 mm) may provide an optimum range between effective sealing and efficient use of sealant. However, depending on embodiments, the first width W1 may be less than about 0.5 mm or greater than about 5 mm, and the second width W2 may be less than about 0.05 mm or greater than about 0.5 mm. A width of the sealant 135 for covering the first and second support members 132 and 133 and the sealing fit 131 may be related to a bond strength of a produced photoelectric conversion module, and may be changed according to a shape of the produced photoelectric conversion module, for example, a thickness of a substrate, a size of the produced photoelectric conversion module, or the like. The width of the sealant may be from about 1 mm to about 10 mm in consideration of both a large-sized module and a small-sized module. Portions of the sealant 135, exceeding the sealing fit 131 and the second support member 133, may be formed to fill between the first and second substrates 110 and 120.

The portions of the sealant 135, exceeding the sealing frit 131 and the first and second support members 132 and 133, may reinforce the sealing characteristics of the photoelectric cell S. For example, the sealant 135 is formed to substantially entirely cover the sealing frit 131 and the support members 132 and 133. In addition, the sealing characteristics of the photoelectric cell S may be improved by using strong adhesion between the sealant 135 formed of, for example, an organic material, and the sealing fit 131 and the support members 132 and 133, which are formed of, for example, an inorganic material.

The sealant 135 is also formed on the sealing frit 131 formed in the photoelectric conversion module 100 so as to cover the sealing frit 131. The sealing frit 131 surrounding the photoelectric cell S may be covered by the sealant 135. The sealing frit 131 is substantially entirely covered by the sealant 135. That is, the sealant 135 substantially entirely covers the sealing frit 131 from the first substrate 110 of the sealing frit 131 to the second substrate 120 so that the sealing frit 131 is not exposed.

In one embodiment, the sealant 135 is formed to exceed or be beyond the sealing frit 131, for example, from two lateral ends of the sealing frit 131 to lateral ends of the sealant 135 by a third width W3 and a fourth width W4, each of which is from about 0.05 mm to about 0.5 mm. In one embodiment, since a portion of the sealant 135, having the third width W3, is adjacent to the photoelectric cell S, the sealant 135 is controlled not to be spread, and thus the third width W3 may be from about 0.05 mm to about 0.5 mm.

Since the sealant 135 is formed to exceed the sealing frit 131, the sealant 135 reinforces an adhesive force between the sealing fit 131 and the sealant 135 and may increase the sealing characteristics of the photoelectric cell S. The sealant 135 exceeding the sealing frit 131 may be formed to fill between the first and second substrates 110 and 120.

Figure 8:
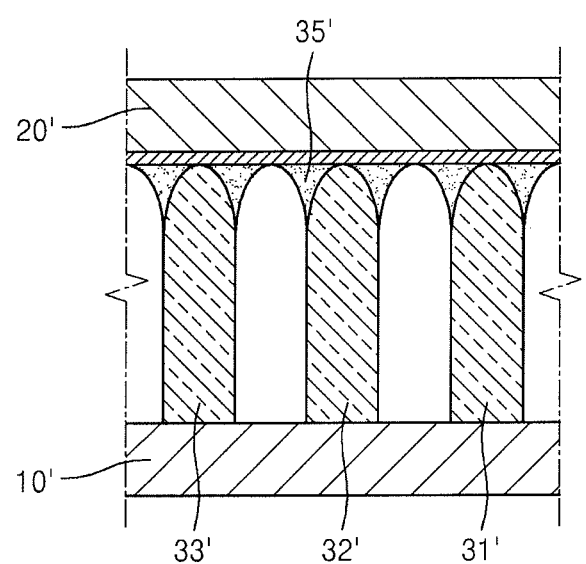
FIG. 8 is a cross-sectional view of a photoelectric conversion module according to a comparative example.

FIG. 8 is a cross-sectional view of a photoelectric conversion module according to a comparative example. Referring to FIG. 8, a sealing fit 31', and support members 32' and 33' are disposed between first and second substrates 10' and 20'. A sealant 35' is formed on the sealing frit 31' and the support members 32' and 33' so as to partially cover the sealing frit 31' and the support members 32' and 33'. The sealant 35' is formed to partially cover upper end portions of the sealing frit 31' and the support members 32' and 33', and thus the sealant 35' functions as a medium for coupling the sealing frit 31' and the support members 32' and 33' to the second substrate 20'.

The sealant 35' that is partially formed on the sealing frit 31' and the support members 32' and 33' has an interface for coupling with the sealing frit 31'. In addition, since the sealant 35' has an insufficient adhesive force, the sealing performance of the photoelectric cell S may be reduced. For example, an electrolyte (not shown) may leak or moisture may penetrate along an interface between the sealing frit 31' and the sealant 35'.

In one embodiment, as shown in FIG. 7, the sealant 135 is formed to substantially entirely cover the sealing frit 131 and the support members 132 and 133 and to exceed the sealing frit 131 and the support members 132 and 133, thereby reinforcing the sealing characteristics of the photoelectric cell S.

Figure 9:
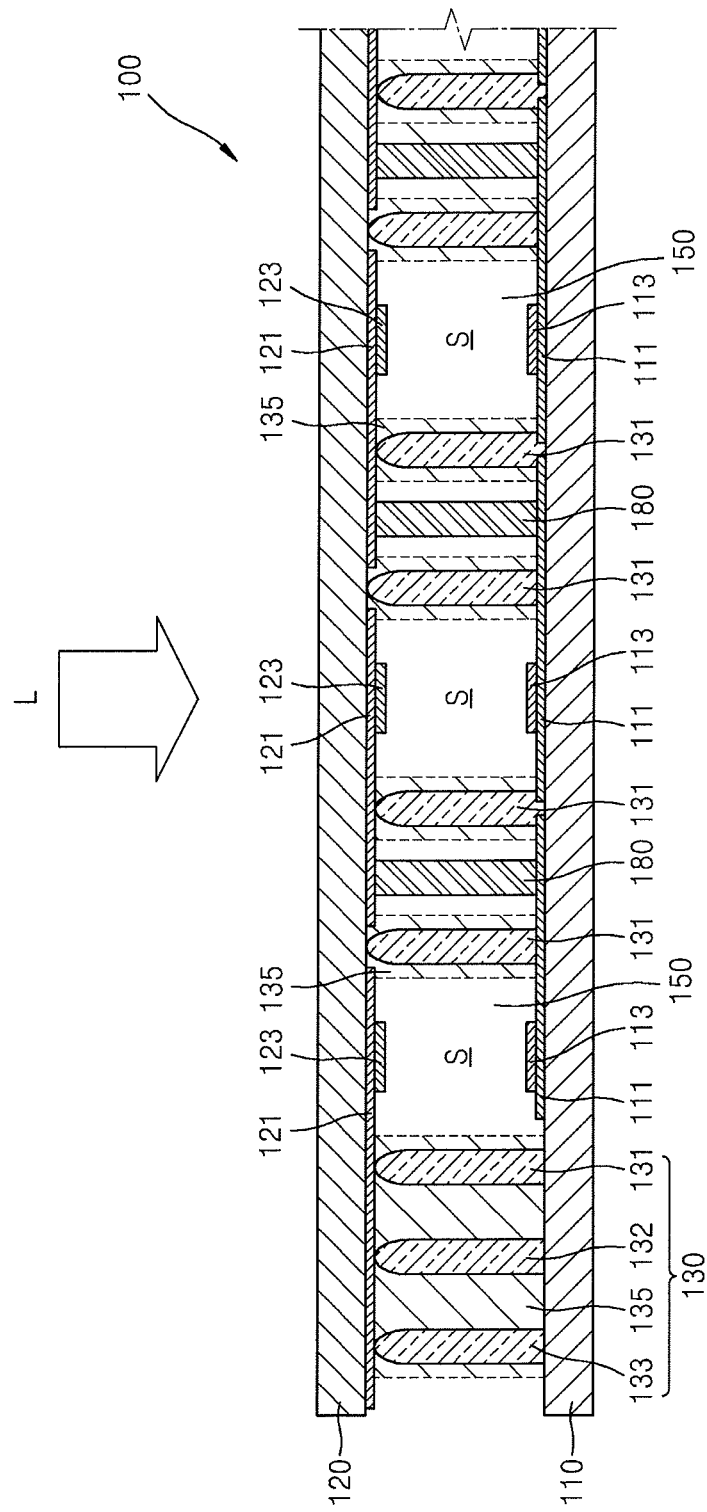
FIG. 9 is a cross-sectional view of the photoelectric conversion module taken along a line A-A of FIG. 1 according to another embodiment.

FIG. 9 is a cross-sectional view of the photoelectric conversion module 100 taken along a line A-A of FIG. 1 according to another embodiment.

Referring to FIG. 9, a plurality of photoelectric cell S defined by the sealing frit 131 are formed between the first and second substrates 110 and 120 facing each other. A connection member 180 is disposed between the neighboring photoelectric cells S so as to connect the neighboring photoelectric cells S to each other. For example, the connection member 180 may connect the photoelectric cell S in series to each other. The connection member 180 may be formed of a metal-based material with excellent electrical conductivity.

The connection member 180 may substantially vertically extend to contact the first electrode 111 and the second electrode 121 which are formed above and below the connection member 180, and connects the first electrode 111 and the second electrode 121 in series to each other between the neighboring photoelectric cells S.

The first and second electrodes 111 and 121 are formed on the first and second substrates 110 and 120, respectively. The sealing frit 131 is placed between the first and second substrates 110 and 120 so that the first and second substrates 110 and 120 may be attached to each other with a predetermined gap. For example, the second substrate 120 may be a light receiving surface for receiving light L so that the second electrode 121 may serve as an optical electrode. In addition, the first substrate 110 may be an opposite surface so that the first electrode 111 may serve as an opposite electrode.

A semiconductor layer 123, on which a photosensitive dye that is excited by light L is adhered, is formed on the second electrode 121, and the electrolyte 150 is disposed between the semiconductor layer 123 and the first electrode 111.

The second substrate 120 may be formed of a transparent material having a high light transmittance. For example, the second substrate 120 may be formed of a glass or a resin film. The resin film is generally flexible, and thus, is suitable for usages requiring the flexibility.

In one embodiment, the second electrode 121 performs as a negative electrode of the photoelectric conversion module 100. For example, the second electrode 121 collects the electrons that are generated by the photoelectric conversion operation to provide a current path. The light L incident through the second electrode 121 performs to excite the photosensitive dye adhered on the semiconductor layer 123. The second electrode 121 may be formed of, for example, a transparent conducting oxide (TCO) such as an indium tin oxide (ITO), a fluorine doped tin oxide (FTO), or an animony doped tin oxide (ATO). The second electrode 121 may further include a metal electrode (not shown) such as gold (Ag), silver (Au), or aluminum (Al) having an excellent electric conductivity. The metal electrode is introduced in order to reduce the electric resistance of the second electrode 121, and may be formed in a stripe pattern or a mesh pattern.

The semiconductor layer 123 may be formed of a semiconductor material that is used as a photoelectric conversion device, for example, an oxide material of metal such as cadmium (Cd), zinc (Zn), indium (In), plumbum (Pb), molybdenum (Mo), tungsten (W), stibium (Sb), titanium (Ti), Ag, manganese (Mn), stannum (Sn), zirconium (Zr), strontium (Sr), gallium (Ga), silicon (Si), or chromium (Cr). The semiconductor layer 123 may increase the photoelectric conversion efficiency due to the photoelectric dye attached thereon. For example, the semiconductor layer 123 may be formed by applying a paste, in which semiconductor particles each having a diameter of about 5 nm to about 1000 nm are dispersed, on the second substrate 120 on which the second electrode 121 is formed, and then, performing a heating process or a compressing process for applying a predetermined heat or pressure onto the paste.

The photosensitive dye attached on the semiconductor layer 123 absorbs the light L that is incident by transmitting through the second substrate 120, and then, electrons of the photosensitive dye are excited from a base state to an excitation state. The excited electrons are transited to a conduction band of the semiconductor layer 123 by an electric bonding between the photosensitive dye and the semiconductor layer 123, and reach the second electrode 121 after passing through the semiconductor layer 123. After that, the electrons are withdrawn to outside via the second electrode 121 to form a driving current that drives an external circuit.

For example, the photosensitive dye attached on the semiconductor layer 123 includes molecules that absorb the light of visible ray wavelength and accelerate the transition of electrons to the semiconductor layer 123 in the excitation state. The photosensitive dye may be a liquid phase, a gel phase, or a solid phase. For example, the photosensitive dye attached on the semiconductor layer 123 may be a ruthenium-based photosensitive dye. When the second substrate 120 on which the semiconductor layer 123 is formed is immersed in a solution including a predetermined photosensitive dye, the semiconductor layer 123 on which the photosensitive dye is attached may be obtained.

The electrolyte 150 may be Redox electrolyte that includes a pair of oxidant and reductant, and a solid type electrolyte, a gel type electrolyte, or a liquid type electrolyte may be used as the electrolyte 150.

The first substrate 110 facing the second substrate 120 does not particularly need to be transparent, however, may be formed of a transparent material for receiving the light L from both sides in order to increase the photoelectric conversion efficiency, and in particular, may be formed of the same material as the first substrate 110.

In one embodiment, the first electrode 111 performs as a positive electrode of the photoelectric conversion module 100. The photosensitive dye attached on the semiconductor layer 123 is excited on receiving the light L, and the excited electrons are withdrawn to outside via the second electrode 121. On the other hand, the photosensitive dye losing the electrons is reduced by collecting the electrons that are provided by oxidation of the electrolyte 150, and the electrolyte 150 is reduced by the electrons reaching the first electrode 111 via the external circuit. Then, the operations of the photoelectric conversion are finished.

For example, the first electrode 111 may be formed of a TCO such as an ITO, FTO, or ATO that is transparent material having the electric conductivity. The first electrode 111 may further include a metal electrode (not shown) such as Ag, Au, or Al having an excellent electric conductivity. The metal electrode is introduced in order to reduce the electric resistance of the first electrode 111, and may be formed in a stripe pattern or a mesh pattern.

A catalyst layer 113 may be formed on the first electrode 111. The catalyst layer 113 is formed of a material having a reduction catalyst function for providing electrons, for example, a metal material such as platinum (Pt), Ag, Au, copper (Cu), or Al, a metal oxide such as a tin oxide, or a carbon-based material such as graphite.

Figure 10:
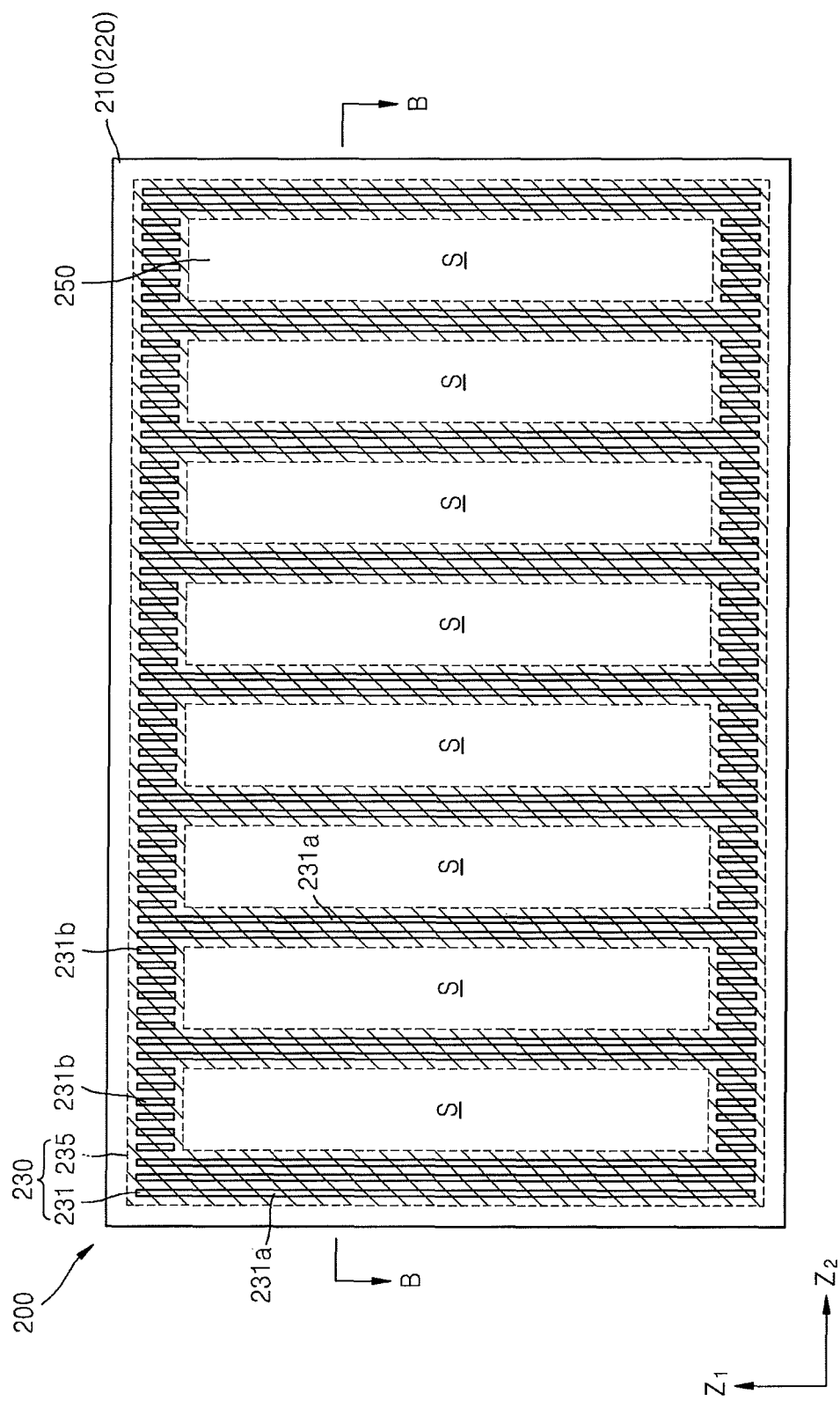
FIG. 10 is a plan view of a photoelectric conversion module according to an embodiment.
Figure 11:
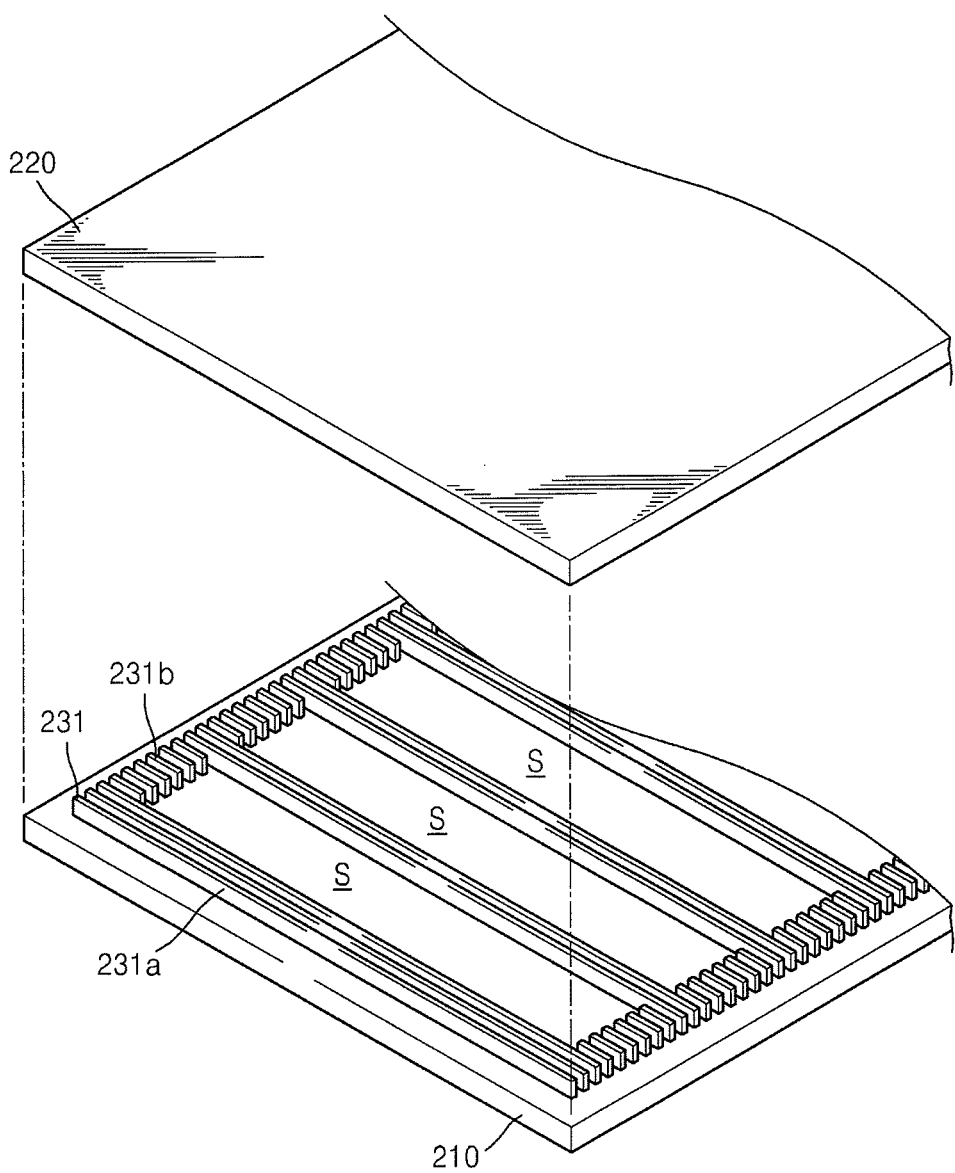
FIG. 11 is a perspective view of a portion of the photoelectric conversion module of FIG. 1 according to an embodiment.

FIG. 10 is a plan view of a photoelectric conversion module 200 according to an embodiment. FIG. 11 is a perspective view of a portion of the photoelectric conversion module 200 of FIG. 1 according to an embodiment.

Referring to FIGS. 10 and 11, the photoelectric conversion module 200 includes a plurality of photoelectric cells S. The photoelectric cells S are defined by sealing members 230. An electrolyte 250 is filled in the photoelectric cells S, and is sealed by the sealing members 230 disposed along an edge of each photoelectric cell S. The sealing members 230 are formed so as to surround the electrolyte 250 and to prevent the electrolyte 250 from leaking outwards.

The sealing members 230 are formed along edge portions of first and second substrates 210 and 220, and define neighboring photoelectric cells S while extending inside the first and second substrates 210 and 220. Each of the sealing members 230 may include a plurality of sealing fits 231 extending in substantially parallel to each other in the first direction Z1, and a sealant 231 formed on the sealing frits 231.

The sealing frits 231 that are spaced apart from each other and extend in the first direction Z1 may form a trace of the sealing member 230. The sealing frits 231 may be formed along edges of the first and second substrates 210 and 220, and extend between the neighboring photoelectric cells S in the first and second substrates 210 and 220. That is, the trace of the sealing member 230 extending inside of the first and second direction Z1 and Z2 may be formed along the edges of the photoelectric cells S having an approximately rectangular shape, by way of an arrangement of a group of sealing fits 231 extending in the first direction Z1.

The sealing frit 231 supports a cell gap between the first and second substrates 210 and 220. For example, the sealing frit 231 may function as a spacer for supporting a space between the first and second substrates 210 and 220 by supporting the second substrate 220 from the first substrate 210 to maintain a predetermined height.

The sealing frits 231 may include a plurality of portions that are spaced apart from each other and may extend in substantially parallel to each other in the first direction Z1. The sealant 235 fills between the portions of the sealing frit 231 so as to increase sealing characteristics.

The sealing frit 231 may have an elongated shape that extends in the first direction Z1, and may include a first sealing frit 231a having a long length and a second sealing frit 231b having a short length.

For example, the first sealing frit 231a extends across the first and second substrates 210 and 220 in edges of the first and second substrates 210 and 220, and extends between the neighboring photoelectric cells S inside of the first and second substrates 210 and 220 so as to define the neighboring photoelectric cells S. The second sealing frit 231b is disposed between first sealing frits 231a in the second direction Z2. The second sealing frit 231b together with the first sealing frit 231a is formed to surround each photoelectric cell S. In one embodiment, each of the first sealing frits 231a includes at least one first sub-frit, and each of the second sealing frits 231b includes a plurality of second sub-fits spaced apart from each other. In this embodiment, the sealant 230 is formed between each of the first and second sub-frits. The second sub-frits may be substantially parallel with each other, as shown in FIG. 10.

The sealing frits 231 extend in the first direction Z1 so as to have directivity. The sealing fit 231 may be patterned by using a predetermined patterning process. For example, the sealing frit 231 may be patterned on the first substrate 210 by using a screen printing method. For example, in the screen printing method, a fit paste (not shown) is put on a pattern mask (not shown) positioned on the first substrate 210, and then the sealing frit 231 is patterned by coating the first substrate 210 with a frit paste (not shown) through an opening the pattern mask while pressing frit paste in a printing direction from one end thereof towards the other end by using a squeeze (not shown).

Figure 12:
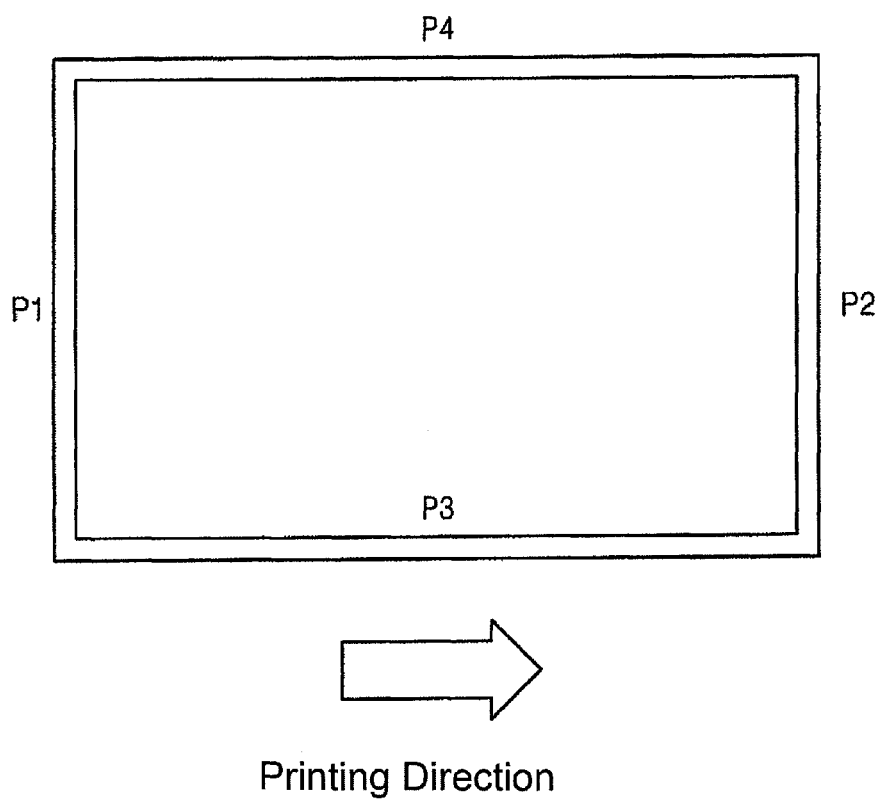
FIG. 12 is a plan view for explaining uniformity according to the difference between a patterning direction and a printing direction of a sealing frit.

According to a difference between a patterning direction of the sealing frit 231 and a printing direction of the sealing frit 231, a height difference of the sealing frit 231 may be generated. FIG. 12 is a plan view for explaining uniformity according to the difference between a patterning direction and a printing direction of a sealing fit. As shown in 12, the sealing frit may include a pair of horizontal patterns P3 and P4 that are disposed in substantially parallel to the printing direction, and a pair of vertical patterns P1 and P2 that are disposed in substantially perpendicular to the printing direction.

Peak values of heights of the horizontal patterns P3 and P4 disposed in substantially parallel to the printing direction may be about 34.4 µm and about 34.0 µm, respectively, and thus relatively uniform heights may be obtained in the horizontal patterns P3 and P4. On the other hand, peak values of heights of the vertical patterns P1 and P2 disposed in substantially perpendicular to the printing direction may be about 33.9 µm and about 36.4 µm, respectively. Thus, it may be seen that heights are remarkably changed. In particular, heights are obviously changed in fine patterns.

In one embodiment as shown in FIG. 10, a patterning direction and a printing direction of a sealing frit 231 are the same as the first direction Z1, thereby removing or reducing a height difference of the sealing frit 231. That is, the sealing frit 231 is formed in the first direction Z1, and the printing direction for embodying the sealing frit 231 is set to the first direction Z1, thereby removing the height difference of the sealing frit 231.

For example, the sealing frit 231 is placed between the first and second substrates 210 and 220, and the second substrate 220 is supported from the first substrate 210 by a predetermined height, thereby obtaining a predetermined cell gap. In addition, when a group of sealing frits 231 is formed over the substantially entire area of the first and second substrates 210 and 220 to have a substantially uniform height, the sealing frits 231 are substantially uniformly attached to the first and second substrates 210 and 220, and thus the sealing fits 231 do not come off the first and second substrates 210 and 220.

On the other hand, a group of sealing frits 231 has a height difference when a sealing frit 231 has a greater or smaller height than another neighboring sealing fit 231. In this case, since some of the sealing frits 231 of the group of sealing fits 231 are not closely attached to the first substrate 210 or the second substrate 220, a space is formed between the sealing frit 231 and the first substrate 210 or the second substrate 220, and thus the sealing characteristics of the sealing frit 231 is reduced, and the electrolyte 250 sealed in the photoelectric cells S may leak.

In FIG. 10, a trace of the sealing member 230 extending to surround the photoelectric cells S is formed by using an arrangement of a group of sealing fit 231 disposed in the first direction Z1, thereby removing a height difference of the sealing frit 231. In addition, a pattern is printed in the first direction Z1 according to directivity of the sealing frit 231 so as to form the sealing frit 231 having a uniform height.

The sealant 235 may be formed on the sealing frit 231 so as to substantially completely cover a group of the sealing frits 231. The sealant 235 fills gaps between the sealing frits 231 that are spaced apart from each other, thereby increasing sealing performance of the sealing member 230. In addition, the sealant 235 function as a medium for closely coupling the sealing frit 231 to the first substrate 210 or the second substrate 220. For example, the sealing frit 231 may be formed based on the first substrate 210, may be patterned on the first substrate 210, and then may be coupled to the second substrate 220 attached onto the first substrate 210. In this case, the sealant 235 may function as a medium for coupling the sealing frit 231 to the second substrate 220.

Compared to the comparative example of FIG. 4, the sealing frit 31 for defining the photoelectric cell S may include the first portion 31a and the second portion 31b, which extend in the first and second directions Z1 and Z2 along an edge of the photoelectric cell S having an approximately rectangular shape.

For example, if a printing direction of the sealing frit 31 is set to the first direction Z1, the first portion 31a having the same printing direction as the first direction Z1 may have a relatively uniform height of the sealing fit 31. However, the second portion 31b extending in a substantially perpendicular direction to the printing direction has a height difference of the sealing frit 31, and thus the sealing frit 31 may come off the first substrate or the second substrate according to the height difference of the sealing frit 31. For example, if a height difference is generated between a portion of the second portion 31b formed at one side and another portion of the second portion 31b formed at another side, the first substrate and the second substrate may be inclined. In addition, the sealing frit 31 may not be closed attached to the first substrate or the second substrate, and thus an electrolyte (not shown) may leak.

In FIG. 10, a group of sealing frits 231 has directivity of the first direction Z1, and the printing direction of the sealing frit 231 is set to the first direction Z1, thereby removing a height difference of the sealing frit 231.

Figure 13:
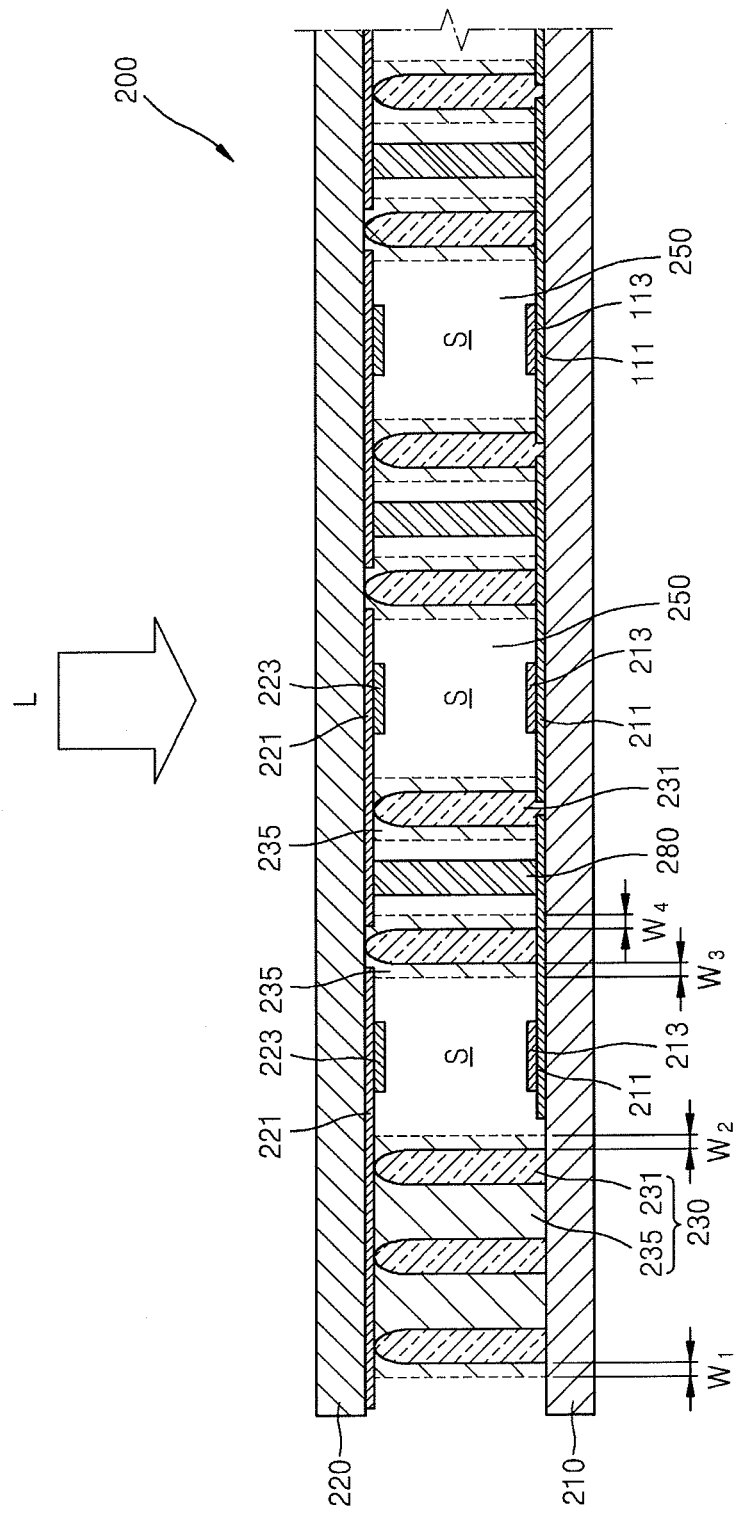
FIG. 13 is a cross-sectional view of the photoelectric conversion module taken along a line B-B of FIG. 10 according to an embodiment.

FIG. 13 is a cross-sectional view of the photoelectric conversion module 200 taken along a line B-B of FIG. 10, according to an embodiment. Referring to FIG. 13, a plurality of photoelectric cells S are arranged between the first and second substrates 210 and 220, and the photoelectric cells S are defined by the sealing frit 231. For example, the sealing frit 231 may be formed based on the first substrate 210, and may protrude towards the second substrate 220 from the first substrate 210.

The sealant 235 may be formed on the sealing fits 231 so as to cover the sealing frits 231. The sealant 235 may function as a medium for closely coupling the sealing frit 231 to the second substrate 220. The sealant 235 may be formed so as to substantially entirely cover the sealing frits 231. In this case, the sealant 235 may be formed to exceed the sealing fit 231. For example, a first width W1 and a second width W2 which are measured from a lateral end of a sealing frit 231 to a lateral end of the sealant 235 may be from about 0.5 mm to about 5 mm, and from about 0.05 mm to about 0.5 mm, respectively, wherein the sealant frit 231 is disposed on edges of the first and second substrates 210 and 220. In addition, a third width W3 and a fourth width W4 which are measured from a lateral end of a sealing frit 231 to a lateral end of the sealant 235 may each be from about 0.05 mm to about 0.5 mm, wherein the sealant frit 231 is disposed inside of the first and second substrates 210 and 220. In one embodiment, since the sealing fit 231 having the second width W2 and the third width W3 is adjacent to the photoelectric cells S, spread of the sealant 235 needs to be controlled, and thus the second width W2 and the third width W3 may be in the range of about 0.05 mm to about 0.5 mm.

Since the sealant 235 is formed to exceed the sealing frit 231 and to cover the sealing frit 231, an adhesive force between the sealant 235 and the sealing frit 231 may be reinforced, and the sealing characteristics of the photoelectric cells S sealed by the sealant 235 and the sealing frit 231 may be reinforced.

Referring to FIG. 13, a connection member 280 is disposed between neighboring photoelectric cells S. For example, the connection member 280 may connect the neighboring photoelectric cells S in series to each other. The connection member 280 may be formed of a metal-based material with excellent electrical conductivity.

The connection member 280 may substantially vertically extend to contact a first electrode 211 and a second electrode 221 which are formed above and below the connection member 280, and connects the first electrode 211 and the second electrode 221 in series to each other between the neighboring photoelectric cells S.

The first and second electrodes 211 and 221 are formed on the first substrate 210 and the second substrate 220, respectively. The sealing frit 231 is placed between the first and second substrates 210 and 220 so that the substrates 210 and 220 may be attached to each other with a predetermined gap. For example, the second substrate 220 may be a light receiving surface for receiving light L so that the second electrode 221 may serve as an optical electrode. In addition, the first substrate 210 may be an opposite surface so that the first electrode 211 may serve as an opposite electrode.

A semiconductor layer 223, on which a photosensitive dye that is excited by light L is adhered, is formed on the second electrode 221, and the electrolyte 250 may be disposed between the semiconductor layer 223 and the first electrode 211.

The photosensitive dye adhered to the semiconductor layer 223 absorbs the light L that is incident by transmitting through the second substrate 220, and electrons of the photosensitive dye is excited from a base state to an excitation state. The excited electrons are transited to a conduction band of the semiconductor layer 223 by an electric bonding between the photosensitive dye and the semiconductor layer 223, and reach the second electrode 221 after passing through the semiconductor layer 223. After that, the electrons are withdrawn to outside via the second electrode 221 to form a driving current that drives an external circuit. A catalyst layer 213 may be formed on the first electrode 211.

As described above, according to at least one of the disclosed embodiments, a photoelectric conversion module provides improved sealing characteristics by forming a sealing frit between substrates so as to have a substantially uniform height so that the sealing frit does not come off the substrates. Furthermore, according to at least one embodiment, since the sealing frits surround the respective photoelectric cells, sealing characteristics of the photoelectric conversion module is enhanced.

Embodiments have been disclosed with reference to the accompanying drawings, and they are not considered limiting. Accordingly, it will be understood by those of ordinary skill in the art that various changes in form and details may be made without departing from the spirit and scope of the following claims.

What is claimed is:

1. A photoelectric conversion module, comprising:
a first substrate;
a second substrate opposing and spaced apart from the first substrate;
a plurality of sealing frits;
a plurality of photoelectric cells defined by the substrates and the sealing frits, wherein the sealing frits surround the photoelectric cells, respectively;
an electrolyte provided in the photoelectric cells; and
a sealant covering the sealing frits and surrounding the photoelectric cells,
wherein each of the photoelectric cells has a substantially rectangular parallelepiped shape, wherein each of the sealing fits comprises a pair of long sides and a pair of short sides, wherein each of the long sides comprises at least one first sub-frit, wherein each of the short sides comprises a plurality of second sub-frits spaced apart from each other, and wherein the sealant is formed between the sub-frits.

2. The photoelectric conversion module of claim 1, wherein each of the photoelectric cells comprises:
a first electrode formed on a first surface of the photoelectric cell;
a catalyst layer formed on the first electrode;
a second electrode formed on a second surface of the photoelectric cell, wherein the second surface faces the first surface; and
a semiconductor layer formed on the second electrode.

3. The photoelectric conversion module of claim 1, further comprising at least one support member surrounding the photoelectric cells, wherein the support member is farther from the photoelectric cells than the sealing frits, and wherein the sealant substantially completely covers the support member.

4. A photoelectric conversion module, comprising:
a first substrate;
a second substrate opposing and spaced apart from the first substrate;
a plurality of sealing frits;
a plurality of photoelectric cells defined by the substrates and the sealing frits, wherein each of the sealing frits surrounds the respective photoelectric cell, wherein the photoelectric cells are spaced apart from each other, wherein each of the photoelectric cells has a substantially rectangular parallelepiped shape, and wherein each of the sealing frits comprises a plurality of sub-sealing frits; and
an electrolyte provided in the photoelectric cells,
wherein each of the sealing frits comprises a pair of long sides and a pair of short sides, wherein each of the long sides comprises at least one first sub-frit, wherein each of the short sides comprises a plurality of second sub-fits spaced apart from each other, and wherein a sealant is formed between the sub-frits.

5. The photoelectric conversion module of claim 4, wherein the sub-sealing fits are substantially parallel with each other.

6. The photoelectric conversion module of claim 4, wherein the first and second sub-frits are substantially parallel with each other.

* * * * *